(12) United States Patent
Oh

(10) Patent No.: US 6,415,021 B1
(45) Date of Patent: Jul. 2, 2002

(54) TECHNIQUE FOR REMOTELY READING E-MAIL USING EXTERNAL TELEPHONE

(75) Inventor: Hoon Oh, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/071,533

(22) Filed: May 4, 1998

(30) Foreign Application Priority Data

May 2, 1997 (KR) .......................................... 1997-17053

(51) Int. Cl.[7] .......................... H04M 11/00; H04M 1/64
(52) U.S. Cl. ............................... 379/88.13; 379/88.17; 379/93.15; 379/93.24
(58) Field of Search ........................... 379/88.13, 88.14, 379/88.22, 88.23, 93.24, 100.08, 100.13, 92.01, 88.17, 93.15; 455/412, 414

(56) References Cited

U.S. PATENT DOCUMENTS

| | | | |
|---|---|---|---|
| 4,659,877 A | 4/1987 | Dorsey et al. | 379/88.14 |
| 4,837,798 A | 6/1989 | Cohen et al. | 379/88.14 |
| 4,996,707 A | 2/1991 | O'Malley et al. | 379/100.13 |
| 5,327,486 A | 7/1994 | Wolff et al. | 379/93.23 |
| 5,349,636 A | 9/1994 | Irribarren | 379/88.15 |
| 5,418,835 A | 5/1995 | Frohman et al. | 455/413 |
| 5,444,768 A | 8/1995 | Lemair et al. | 379/68 |
| 5,475,738 A | 12/1995 | Penzias | 379/88.14 |
| 5,479,411 A | 12/1995 | Klein | 379/88.13 |
| 5,479,491 A | 12/1995 | Garcia et al. | 379/88.15 |
| 5,524,137 A | 6/1996 | Rhee | 379/88.01 |
| 5,530,740 A | 6/1996 | Irribarren et al. | 379/88.17 |
| 5,668,854 A | 9/1997 | Minakami et al. | 379/88.18 |
| 5,675,507 A | 10/1997 | Bobo, II | 709/206 |
| 5,712,901 A | 1/1998 | Meermans | 379/88.14 |
| 5,717,742 A | 2/1998 | Hyde-Thomas | 379/88.17 |
| 5,737,395 A * | 4/1998 | Irribarren | 379/88.13 |
| 5,825,854 A * | 10/1998 | Larson et al. | 379/88.14 |
| 5,956,486 A * | 9/1999 | Hickman et al. | 709/206 |
| 5,964,833 A * | 10/1999 | Kikinis | 709/206 |
| 5,991,365 A * | 11/1999 | Pizano et al. | 379/88.13 |
| 5,991,366 A * | 11/1999 | Henrick et al. | 379/88.18 |
| 6,052,442 A * | 4/2000 | Cooper et al. | 379/88.19 |
| 6,061,718 A * | 5/2000 | Nelson | 709/206 |
| 6,067,354 A * | 5/2000 | Bauer et al. | 379/113 |

FOREIGN PATENT DOCUMENTS

KR 96-3233 1/1996 ............ H04M/1/26

* cited by examiner

Primary Examiner—Fan Tsang
Assistant Examiner—Ovidio Escalante
(74) Attorney, Agent, or Firm—Robert E. Bushnell, Esq.

(57) ABSTRACT

A technique for reading speech mail or text E-mail stored in a computer by an external telephone uses an apparatus which includes: a text to speech converting service function, a speech sensing function, an E-mail managing function, and an E-mail down-loading function. The apparatus may use software which includes a program for calling the E-mail client of a computer by one of a public telephone, a cellular phone, and a portable computer having a speed phone capability, gaining access to the received E-mail, converting text E-mail into speech mail, and transmitting it to a receiver through a telephone line. Also, a computer periodically detects an E-mail server during the absence of a user and, when it is determined that there is received E-mail as a result of detecting the E-mail server, down-loads the E-mail and stores it in the computer. When urgent E-mail is received, the computer calls a receiver and informs him or her that urgent E-mail has arrived or transmits the urgent E-mail to the remote receiver. It is possible to detect only speech mail among the received E-mail in the E-mail server and to detect all the E-mail including text E-mail. Therefore, when the detected E-mail is text E-mail, the E-mail is converted into speech mail and transmitted.

21 Claims, 5 Drawing Sheets

TECHNIQUE FOR REMOTELY READING E-MAIL USING EXTERNAL TELEPHONE

CLAIM OF PRIORITY

This application makes reference to, incorporates the same herein, and claims all benefits accruing under 35 U.S.C. §119 from an application entitled METHOD FOR READING MAIL USING EXTERNAL TELEPHONE AND APPARATUS THEREFOR earlier filed in the Korean Industrial Property Office on the May 2, 1997, and there duly assigned Serial No. 17053/1997.

BACKGROUND OF THE INVENTION

The present invention relates to a technique for remotely reading E-mail using an external telephone, and more particularly, to a technique for remotely reading E-mail using an external telephone in which a user can call an E-mail client of his or her personal computer (PC) using an external telephone and remotely read down-loaded E-mail by a periodic communication between the PC and an E-mail server.

So far, it is possible to communicate with a PC using an ordinary telephone only when someone is near the PC. Even when someone is near the PC, it is possible to communicate with the PC using the telephone only when a speech communication can be performed by the PC itself. Namely, in the case of the communication between the telephone and the PC, a communication can be performed only when a counterpart exists like in a communication between ordinary telephones. However, when the E-mail received from a counterpart is managed using a function of managing E-mail among the functions of the PC, the counterpart does not have to exist during the communication between the telephone and the PC.

The communication between the telephone and the PC has a problem in that it is impossible to confirm E-mail through an external telephone when the E-mail is received as a text file. However, even when the E-mail is received as a text file, it is possible to transmit speech-converted E-mail through a telephone line when there exist functions of down-loading E-mail and converting the E-mail of the down-loaded text file into a speech file.

It is because checking a speech-converted message is much easier than reading text mail stored in the PC during driving a car that a speech converting function is considered important in the case of the communication between the telephone and the PC.

Therefore, when E-mail is received as a text file when a PC does not have functions of down-loading E-mail, managing E-mail, and converting the text file into a speech, it is impossible to gain access to the received E-mail by an external telephone.

The following patents each disclose features in common with the present invention but do not teach or suggest an E-mail reading technology which implements a service system at the server side and adapts a power saving mode prior to communicating with the E-mail server and subsequent to the down-loading of the E-mail as in the present invention: U.S. Pat. No. 4,659,877 to Dorsey et al., entitled Verbal Computer Terminal System, U.S. Pat. No. 4,837,798 to Cohen et al., entitled Communication System Having Unified Messaging, U.S. Pat. No. 4,996,707 to O'Malley et al., entitled Text-To Speech Converter Of A Facsimile Graphic Image, U.S. Pat. No. 5,349,636 to Irribarren, entitled Interface System And Method For Interconnecting A Voice Message System And An Interactive Voice Response System, U.S. Pat. No. 5,418,835 to Frohman et al., entitled Method of Delivering Paging Messages Using Voice Mail, U.S. Pat. No. 5,444,768 to Lemaire et al., entitled Portable Computer Device For Audible Professing Of Remotely Stored Messages, U.S. Pat. No. 5,475,738 to Penzias, entitled Interface Between Text And Voice Messaging Systems, U.S. Pat. No. 5,479,491 to Herreoro Garcia et al., entitled Integrated Voice-Mail Based Voice And Information Processing System, U.S. Pat. No. 5,524,137 to Rhee, entitled Multi-Media Messaging System, U.S. Pat. No. 5,530,740 to Irribarren et al., entitled System And Method For Integrating Voice, Facsimile And Electronic Mail Data Through A Personal Computer, U.S. Pat. No. 5,675,507 to Bobo II, entitled Message Storage And Delivery System, U.S. Pat. No. 5,668,854 to Minakami et al., entitled Distributed System For Call Processing, U.S. Pat. No. 5,712,901 to Meermans, entitled Automatic Voice/Text Translation Of Phone Mail Messages, and U.S. Pat. No. 5,717,742 to Hyde-Thomson, entitled Electronic Mail System Having Integrated Voice Messages.

SUMMARY OF THE INVENTION

It is an objective of the present invention to provide a method of remotely reading E-mail down-loaded in a PC by an external telephone.

It is another objective of the present invention to provide an apparatus for remotely reading E-mail downloaded in a PC using an external telephone.

To achieve the first objective, there is provided a method for remotely reading E-mail using an external telephone, comprising the steps of (a) periodically performing a communication between a personal computer (PC) and an E-mail server, checking whether there is new E-mail in the E-mail server, and down-loading the E-new mail to the PC, the PC being in a power saver mode prior to communicating with the E-mail server and subsequent to the down-loading of E-mail (b) checking whether or not the down-loaded E-mail is a text file and storing the E-mail if the E-mail is a speech file and converting the E-mail into a speech file and storing it if the E-mail is a text file, and (c) checking whether there is a newly received E-mail which is down-loaded to the PC in response to a phone call from the external telephone to an E-mail client of the PC, and (d) reading the E-mail and transmitting it through a MODEM when there is received E-mail in step (c).

Preferably, the method for reading E-mail using an external telephone further comprises the steps of (e) checking whether new E-mail has been received by performing a communication between the PC and the E-mail server and using the external telephone if there is no received E-mail in step (c), if there is received E-mail, instructing whether the new E-mail is to be down-loaded and transmitted, and (f) down-loading the new E-mail and then transmitting the down-loaded new E-mail through the MODEM when there are down-load transmit commands in step (e).

To achieve the second objective, there is provided an apparatus for remotely reading E-mail using an external telephone, comprising a down-loader for down-loading new E-mail, in which a PC periodically communicates with an E-mail server and checks whether new E-mail has arrived at the E-mail server, the PC being in a power saver mode prior to communicating with the E-mail server and subsequent to the down-loading of E-mail, a text to speech converter for checking whether the down-loaded E-mail is a text file, and storing a speech file if the E-mail is a speech file and conveting a text file into a speech file and storing the converted result if the E-mail is a text file, and a MODEM for transmitting newly down-loaded E-mail if any, in response to a phone call from an external telephone to an E-mail client.

Preferably, in the apparatus for reading E-mail using an external telephone, the down-loader down-loads and transmits new E-mail according to commands from an external telephone when it is determined that there is new E-mail as a result in which the PC communicates with the E-mail server and checks whether new E-mail has arrived at the E-mail server, if there is no down-loaded E-mail.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the structure and operation of the present invention will be described in more detail with reference to the attached drawings.

Figure 1:
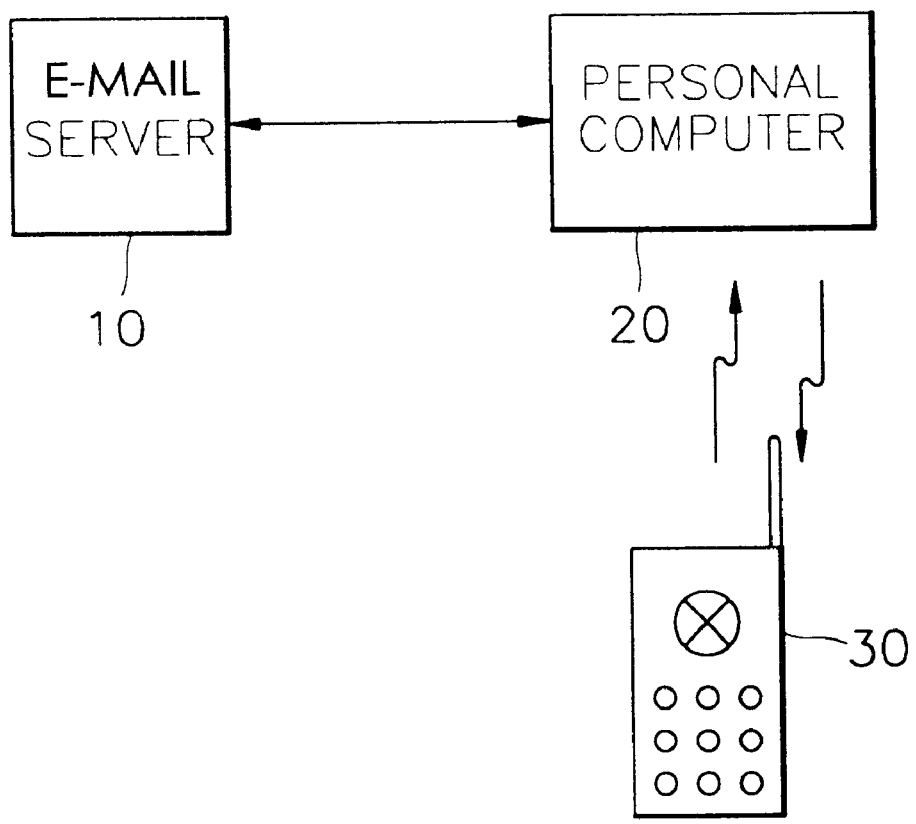
FIG. 1 is a schematic view for describing an E-mail reading system according to the present invention.
Figure 2A:
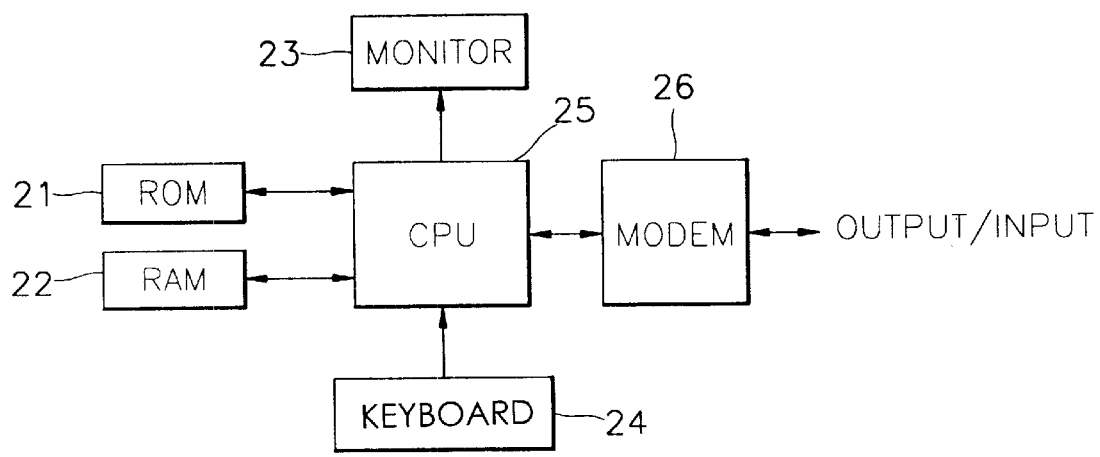
FIGS. 2A and 2B schematically show the hardware and software of a personal computer applied to the present invention.
Figure 2B:
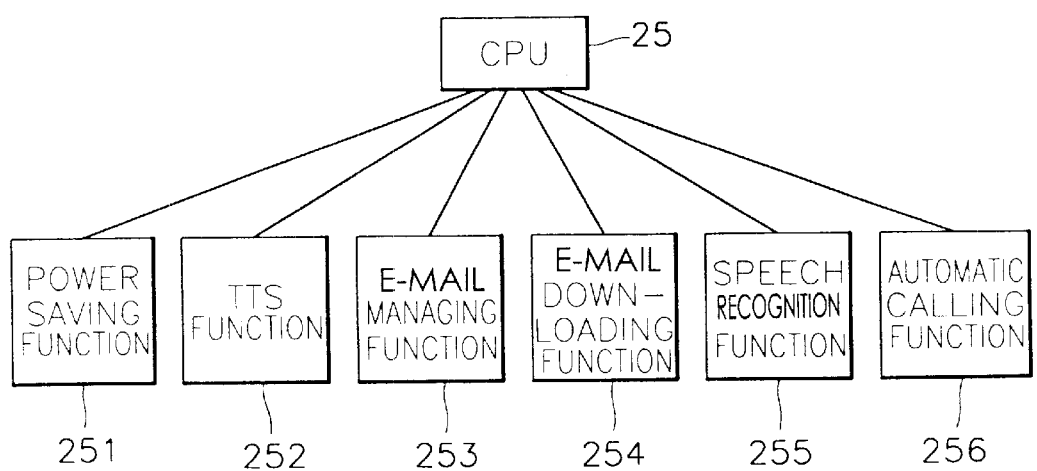

Referring to FIG. 1 showing a schematic view describing a mail reading system according to the present invention, it is possible to construct a system in which a user can confirm and read the E-mail received in his or her PC by an external telephone using a personal computer (PC) 20 and an E-mail server 10. In this case, as shown in FIG. 2A, the PC 20 includes an ROM 21 for storing various software program functions, an RAM 22 for storing various data including E-mail, a monitor 23 for displaying the data, a keyboard 24 for inputting the commands of a user, a MODEM 26 used for transmitting data from the PC 20 or receiving external data, and a central processing unit (CPU) 25 for controlling all of the elements using software. As shown in FIG. 2B, the PC 20 software includes programs such as a power saving function 251 stored in the ROM 21 and performed by the CPU 25, a text-to-speech conversion (TTS) function 252, an E-mail managing function 253, an E-mail down-loading function 254, a speech recognition function 255, and an automatic calling function 256.

As mentioned above, an E-mail reading apparatus according to the present invention in which an external telephone is used needs a communication interface such as a MODEM and a LAN which enables speech communication. The MODEM does not have to be included as hardware since it can be realized as software. In software programs basically supplied to the present invention, the power saving function is for maintaining the PC in a screen saver state or a sleep state when the PC is not used in order to save power. The TTS function is for converting a text document into a speech file. The E-mail managing function is for appropriately managing the received E-mail and formatting them in a pattern desired by a receiver. The E-mail down-load function is for down-loading E-mail from an E-mail server. The speech recognition function is for recognizing commands or messages in the form of a speech and processing them. The automatic calling function is for automatically calling using the PC.

A process in which a PC user calls his or her PC during his or her absence and confirms whether there is newly received E-mail or reads the E-mail and a process in which the PC automatically calls the receiver and reads E-mail to the receiver when urgent E-mail is received, using the basic function and structure of the E-mail reading apparatus by the external telephone according to the present invention will be described in more detail with reference to FIGS. 3, 4, and 5.

Figure 3:
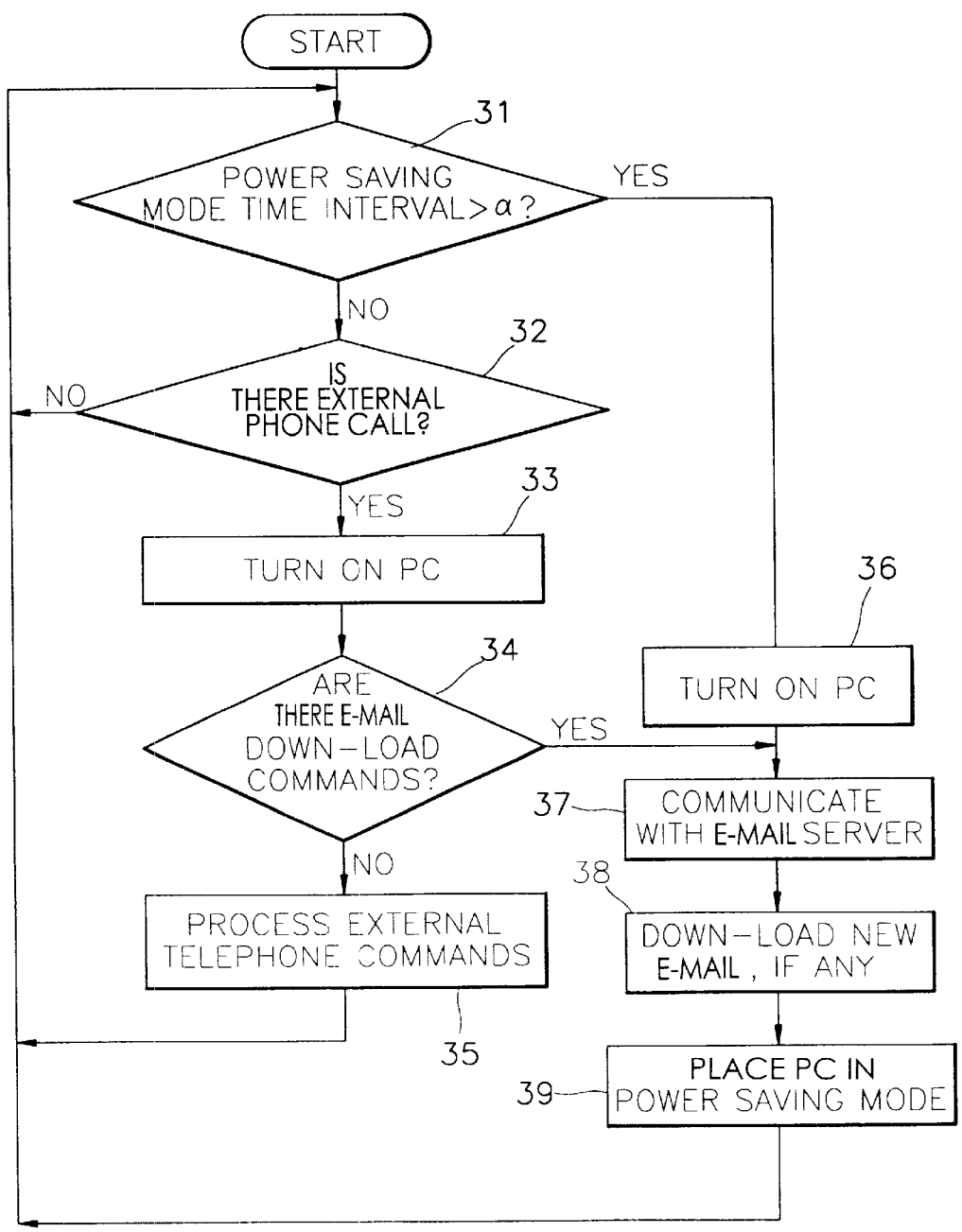
FIG. 3 is a flowchart showing a communication performed between a computer and an E-mail server for performing a method for reading E-mail according to the present invention.

FIG. 3 is a flowchart describing a communication between the PC 20 and the E-mail server in order to perform a method for reading E-mail according to the present invention. When the PC 20 is in a power saving mode, it is checked whether the interval of time in which the power saving mode continues is longer than a predetermined time $\alpha$ (step 31). When a duration in which the power saving mode has been maintained is longer than the predetermined time a, the PC is turned on (step 36). Then, a communication with the E-mail server 10 is performed (step 37). It is checked whether new E-mail is stored in the E-mail server and, if so, the new E-mail is down-loaded (step 38). Then, the PC is placed in the power saving mode and the process returns to step 31 (step 39). When the interval of the time in which the power saving mode has continued in step 31 is not longer than the predetermined time a, the PC 20 checks whether there is a phone call from an external telephone 30 (step 32). A public telephone, a cellular phone, or a portable PC in which a speech phone call is possible can be used as the external telephone 30. When it is determined that there is no external phone call in step 32, the process returns to step 31. When it is determined that there is an external phone call, the PC 20 is turned on (step 33) and it is checked whether an E-mail down-load command has been received from the external telephone 30 (step 34). When it has been determined that an E-mail down-load command has been received in step 34, the process proceeds to step 37 to enable the PC to perform a communication with the E-mail server and then new E-mail is down-loaded and stored in the RAM 22 in the PC 20 in step 38. When it has been determined that an E-mail down-load command has not been received in step 34, the process proceeds to step 35 and other commands from the external telephone are processed. Then, the process returns to step 31. Accordingly, processes for automatically searching the new E-mail arrived at an E-mail client by a periodic communication between the E-mail server 10 of the PC 20 and storing the new E-mail in the RAM 22 in the PC 20 are performed.

Figure 4:
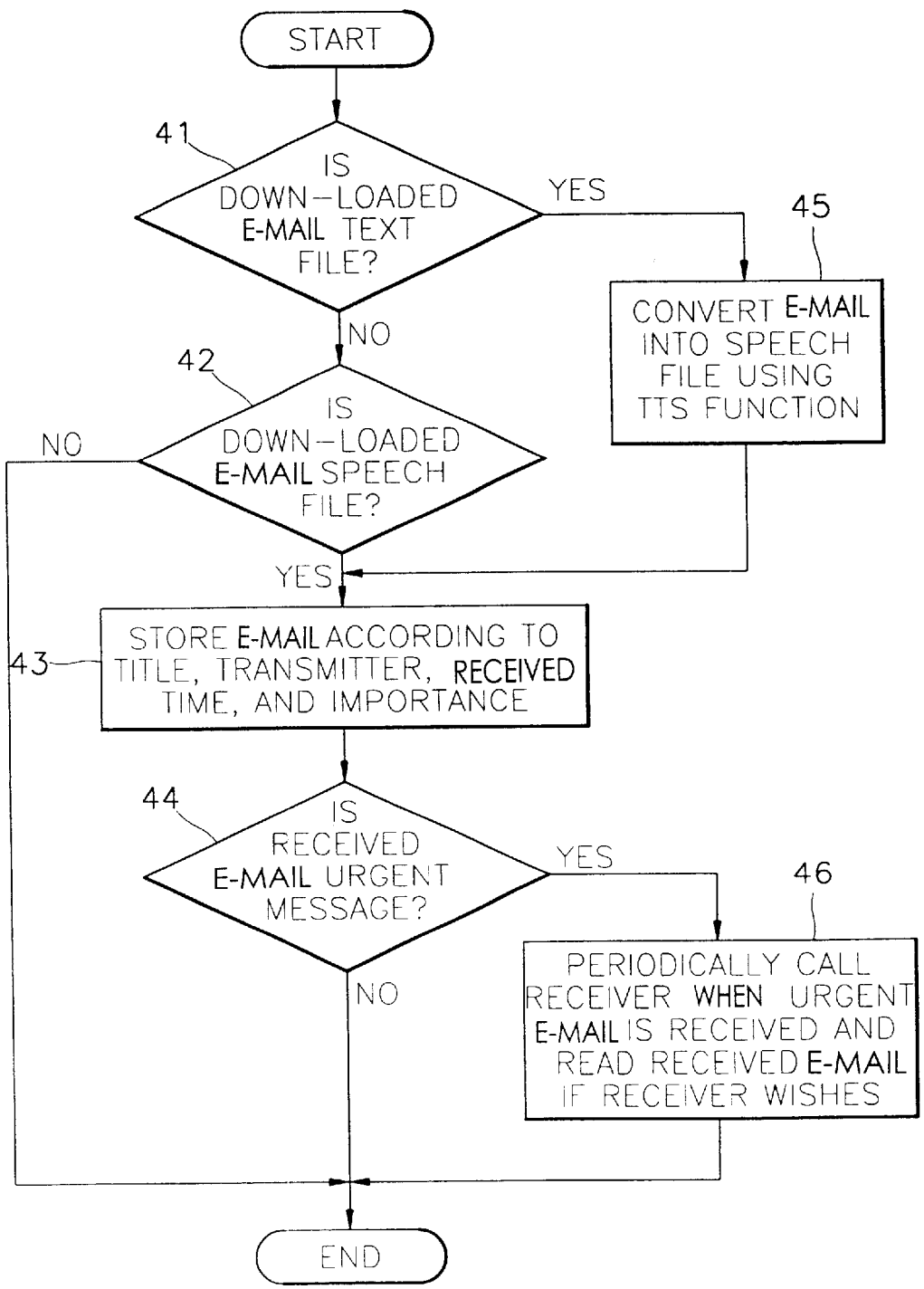
FIG. 4 is a flowchart showing an E-mail managing program performed in a computer in order to perform the method for reading E-mail according to the present invention.
Figure 5:
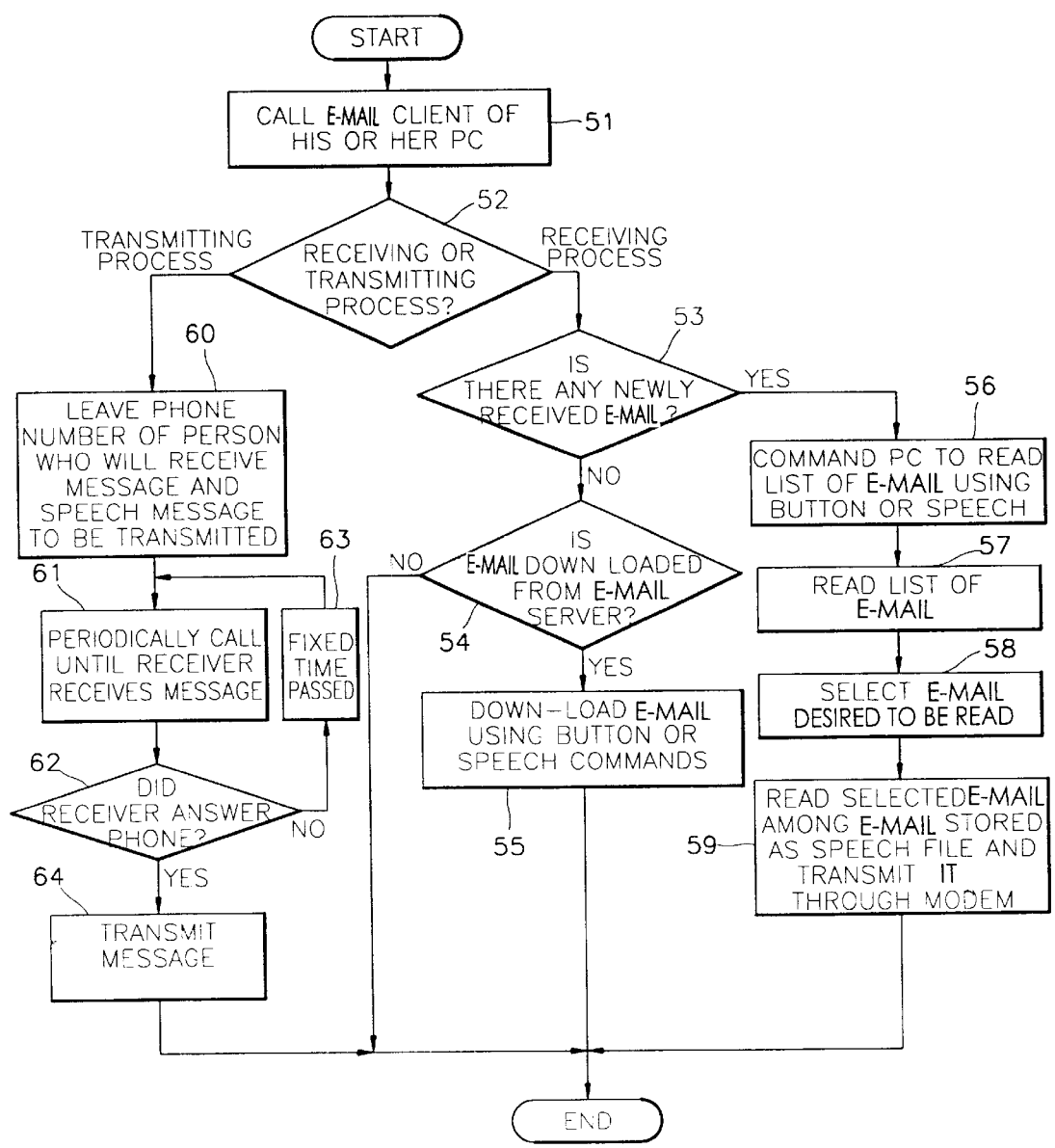
FIG. 5 is a flowchart showing processes for reading E-mail in a computer by an external telephone in order to perform the method for reading E-mail according to the present invention.

FIG. 4 is a flowchart showing the E-mail managing program performed in a computer in order to perform the E-mail reading method according to the present invention. The E-mail managing function in which, when the down-loaded E-mail is a text file, and is converted into speech mail and appropriately processed according to the degree of importance and urgency of the received E-mail is shown in FIG. 4. In FIG. 4, if the down-loaded E-mail is determined to be a text file in step 41, the process proceeds to step 45 in which the text files are converted into speech mail using the TTS function and then, the process proceeds to step 43. If the down-loaded E-mail is determined not to be a text file in step 41, the process proceeds to step 42 in which it is checked whether the E-mail is a speech file. When the E-mail is not a speech file, the program is terminated. When the E-mail is a speech file, the process proceeds to step 43 in which the E-mail is categorized according to the degree of importance such as the title, transmitter, and received time thereof and stored. In step 44, when the E-mail is urgent, the PC 20 periodically performs in step 46 the function of automatically calling a receiver until the receiver receives the urgent E-mail, reads the urgent E-mail transmitted to the receiver if the receiver wants and terminates the program. However, when the E-mail is determined not to be urgent in step 44, the program is immediately terminated. The processes of storing the new E-mail detected from the E-mail server 10 in the PC 20 or transmitting the E-mail to the receiver have been described above.

The processes of confirming and reading the newly received E-mail stored in the PC 20 using an external telephone 30 will be described. FIG. 5 is a flowchart showing processes for reading the E-mail stored in a computer by an external telephone in order to perform the method for reading E-mail according to the present invention. The processes in which the receiver, who is not near the PC due to a business trip, travel, or driving a car, confirms and reads the newly received E-mail by remotely calling his or her PC are shown in FIG. 5. When the receiver remotely calls the mail client of his or her PC 20 in step 51, the PC 20 determines whether to perform a receiving process or a transmitting process in step 52. When the PC performs the receiving process, a determination is made as to whether there is newly received E-mail in step 53. When it has been determined that there is new E-mail in step 53, the receiver gives commands to the PC 20 through a telephone button or speech to read the list of E-mail in step 56. The PC 20 reads the list of E-mail in step 57 and the receiver remotely selects E-mail he or she wishes to read using an external telephone 30 in step 58. The PC 20 reads the selected E-mail and transmits it to the external telephone 30 through a MODEM in step 59. When it is determined that there is no newly received E-mail in the PC 20 in step 53, the process proceeds to step 54, in which the PC 20 detects E-mail from the E-mail server 10 and, when there is newly received E-mail, checks whether the newly received E-mail is to be down-loaded. At this time, such down-load commands are remotely transmitted to the PC 20 through the external telephone 30. In step 55, when the down-load commands are given, the PC 20 down-loads the new E-mail from the E-mail server 10 by the above-mentioned operation and transmits it through the MODEM 26. Accordingly, it is possible to remotely confirm and read the E-mail stored in the PC 20 or the new E-mail which has arrived at the E-mail server 10 using the external telephone 30. When it is determined that the transmitting process is to be performed in step 52, the process proceeds to step 60, in which the user stores the telephone number of the person who will receive a message and a speech message to be transmitted. Then, the PC 20 periodically performs the calling function until the receiver receives the message in step 61. When it is determined that the receiver has answered the phone in step 62, the process proceeds to step 64, in which the message is transmitted and the program is terminated. When it is determined that the receiver has not answered the phone in step 62, the process returns to step 61 via step 63 confirming whether a predetermined time has passed and a periodic calling is performed until the receiver answers the phone.

As mentioned above, in a technique for remotely reading E-mail using an external telephone according to the present invention, it is possible to improve the quality of a communication service since a user can read the E-mail transmitted to his or her PC as speech during a business trip, travel or driving a car and to improve the flexibility of a communication since a communication can be performed even if both parties performing a communication are not near the PC Also, it is possible to increase the speed of the communication since the PC automatically calls a receiver and informs him or her of the E-mail or message by speech if a telephone number by which it is possible for the PC to gain access to the receiver is available when important or urgent E-mail is transmitted even if the receiver is absent.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of remotely reading E-mail using an external telephone, comprising the steps of:

performing a communication between a personal computer and an E-mail server, the communication including the personal computer periodically determining whether there is new E-mail in the E-mail server, and when there is new E-mail in the E-mail server downloading the new E-mail to the personal computer;

determining when there is new E-mail whether down-loaded new E-mail is a text file, storing in the personal computer down-loaded new E-mail that is a speech file, and converting down-loaded new E-mail that is a text file into a speech file and storing in the personal computer the converted down-loaded new E-mail;

determining whether there is any received E-mail stored in the personal computer in response to a phone command from an external telephone to the personal computer;

selectively reading the E-mail stored in the personal computer and selectively transmitting the E-mail stored in the personal computer to a modem when it is determined in response to the phone command from the external telephone that there is received E-mail stored in the personal computer;

determining whether any new E-mail has been received by the E-mail server by performing a communication between the personal computer and the E-mail server in response to the phone command from the external telephone when it is determined that there is no received E-mail stored in the personal computer; and down-loading to the personal computer any new E-mail received by the E-mail server and then transmitting down-loaded new E-mail from the personal computer to the modem when it is determined that there is no received E-mail stored in the personal computer and when there is a down-load transmit command from the external telephone.

2. The method of claim 1, further comprised of the personal computer after being in a power saver mode for a predetermined time communicating with the E-mail server and determining whether there is newly received E-mail in the E-mail server and down-loading any newly received E-mail from the E-mail server to the personal computer and, alternatively, the personal computer responding to a phone call to the personal computer and down-loading any newly received E-mail from the E-mail server to the personal computer in response to the phone call.

3. The method of claim 1, further comprising a step of the personal computer calling a corresponding E-mail receiver to transmit down-loaded E-mail stored in the personal computer to the corresponding E-mail receiver when down-loaded E-mail stored in the personal computer for the corresponding E-mail receiver is determined to be urgent E-mail.

4. The method of claim 1, further comprised of the step of selectively reading the E-mail stored in the personal computer and selectively transmitting the E-mail stored in the personal computer comprising the steps of:

receiving by the personal computer a read command from the external telephone to read an E-mail list of the down-loaded E-mail stored in the personal computer;

reading and transmitting to the external telephone the E-mail list according to the read command;

receiving by the personal computer an E-mail select signal from the external telephone for selecting desired E-mail from the transmitted E-mail list; and transmitting from the personal computer the selected E-mail stored in the personal computer according to the E-mail select signal.

5. The method of claim 4, further comprised of the external telephone comprising any one of a public telephone, a cellular phone and a portable personal computer including a speech phone capability.

6. The method of claim 5, further comprising the steps of:

storing in the personal computer a telephone number of a receiver for a message and the message, when the telephone number of the receiver for the message and the message are transmitted by the external telephone to the personal computer; and performing by the personal computer a calling function to transmit the stored message until the receiver for the stored message receives the stored message, when the telephone number of the receiver for the message and the message are stored in the personal computer.

7. The method of claim 1, further comprising the steps of:

storing in the personal computer a telephone number of a receiver for a message and the message when the telephone number of the receiver for the message and the message are transmitted by the external telephone to the personal computer; and performing by the personal computer a calling function to transmit the stored message until the receiver for the stored message receives the stored message, when the telephone number of the receiver for the message and the message are stored in the personal computer.

8. A method of remotely reading E-mail using an external telephone, comprising the steps of:

performing a communication between a personal computer and an E-mail server the communication including the personal computer periodically determining whether there is new E-mail in the E-mail server, and when there is new E-mail in the E-mail server down-loading the new E-mail to the personal computer:

determining when there is new E-mail whether down-loaded new E-mail is a text file, storing in the personal computer down-loaded new E-mail that is a speech file, and converting down-loaded new E-mail that is a text file into a speech file and storing in the personal computer the converted down-loaded new E-mail;

determining whether there is any received E-mail stored in the personal computer in response to a phone command from an external telephone to the personal computer;

selectively reading the E-mail stored in the personal computer and selectively transmitting the E-mail stored in the personal computer to a modem when it is determined in response to the phone command from the external telephone that there is received E-mail stored in the personal computer;

storing in the personal computer a telephone number of a receiver for a message and the message, when the telephone number of the receiver for the message and the message are transmitted by the external telephone to the personal computer; and performing by the personal computer a calling function to transmit the stored message until the receiver for the stored message receives the stored message, when the telephone number of the receiver for the message and the message are stored in the personal computer.

9. The method of claim 8, further comprised of the personal computer after being in a power saver mode for a predetermined time communicating with the E-mail server and determining whether there is newly received E-mail in the E-mail server and down-loading any newly received E-mail from the E-mail server to the personal computer and, alternatively, the personal computer responding to a phone call to the personal computer and down-loading any newly received E-mail from the E-mail server to the personal computer in response to the phone call.

10. The method of claim 8, further comprising a step of the personal computer calling a corresponding E-mail receiver to transmit down-loaded E-mail stored in the personal computer to the corresponding E-mail receiver when down-loaded E-mail stored in the personal computer for the corresponding E-mail receiver is determined to be urgent E-mail.

11. The method of claim 8, further comprised of the step of selectively reading the E-mail stored in the personal computer and selectively transmitting the E-mail stored in the personal computer comprising the steps of:

receiving by the personal computer a read command from the external telephone to read an E-mail list of the down-loaded E-mail stored in the personal computer;

reading and transmitting to the external telephone the E-mail list according to the read command;

receiving by the personal computer an E-mail select signal from the external telephone for selecting desired E-mail from the transmitted E-mail list; and transmitting from the personal computer the selected E-mail stored in the personal computer according to the E-mail select signal.

12. The method of claim 11, further comprised of the external telephone comprising any one of a public telephone, a cellular phone and a portable personal computer including a speech phone capability.

13. An apparatus for remotely reading E-mail using an external telephone, comprising:

a down-loader for down-loading new E-mail from an E-mail server to a personal computer, in which the personal computer periodically communicates with the E-mail server and determines whether new E-mail has arrived at the E-mail server, and the down-loader for down-loading from the E-mail server to the personal computer any new E-mail received by the E-mail server according to a down-load transmit command from an external telephone when it is determined in response to a phone command from the external telephone that there is no received E-mail stored in the personal computer;

a text to speech converter for determining whether down-loaded E-mail is a text file, for storing in the personal computer down-loaded E-mail that is a speech file, for converting down-loaded E-mail that is a text file into a speech file and for storing the converted down-loaded E-mail in the personal computer; and a modem for transmitting from the personal computer selected down-loaded E-mail stored in the personal computer in response to the phone command from the external telephone, and the modem for transmitting from the personal computer any down-loaded E-mail received from the E-mail server in response to the down-load transmit command from the external telephone.

14. The apparatus of claim 13, further comprised of the personal computer for automatically calling a corresponding E-mail receiver and for transmitting down-loaded E-mail stored in the personal computer to the corresponding E-mail receiver when down-loaded E-mail stored in the personal computer for the corresponding E-mail receiver is determined to be urgent E-mail.

15. The apparatus of claim 13, further comprised of the external telephone comprising any one of a public phone, a cellular phone and a portable personal computer including a speech phone capability.

16. The apparatus of claim 15, further comprised of the down-loader for communicating with the E-mail server after the personal computer has been in a power saver mode for a predetermined time and for down-loading new E-mail from the E-mail server to the personal computer when new E-mail has been received, and the down-loader for down-loading new E-mail from the E-mail server to the personal computer when new E-mail has been received when there is a phone call to the personal computer even when the personal computer has not periodically communicated with the E-mail server.

17. The apparatus of claim 13, further comprising:

means for storing in the personal computer a telephone number of a receiver for a message and the message for the receiver, when the telephone number of the receiver for the message and the message are transmitted by the external telephone to the personal computer; and means for performing by the personal computer a calling function to transmit the stored message to the receiver for the stored message until the receiver for the stored message receives the stored message, when the telephone number of the receiver for the message and the message are stored in the personal computer.

18. An apparatus for remotely reading E-mail using an external telephone, comprising:

a down-loader for down-loading new E-mail from an E-mail server to a personal computer, in which the personal computer periodically communicates with the E-mail server and determines whether new E-mail has arrived at the E-mail server;

a text to speech converter for determining whether down-loaded E-mail is a text file, for storing in the personal computer down-loaded E-mail that is a speech file, for converting down-loaded E-mail that is a text file into a speech file and for storing the converted down-loaded E-mail in the personal computer;

a modem for transmitting from the personal computer selected down-loaded E-mail stored in the personal computer in response to a phone command from an external telephone;

means for storing in the personal computer a telephone number of a receiver for a message and the message for the receiver, when the telephone number of the receiver for the message and the message are transmitted by the external telephone to the personal computer; and means for performing by the personal computer a calling function to transmit the stored message to the receiver for the stored message until the receiver for the stored message receives the stored message, when the telephone number of the receiver for the message and the message are stored in the personal computer.

19. The apparatus of claim 18, further comprised of the personal computer for automatically calling a corresponding E-mail receiver and for transmitting down-loaded E-mail stored in the personal computer to the corresponding E-mail receiver when down-loaded E-mail stored in the personal computer for the corresponding E-mail receiver is determined to be urgent E-mail.

20. The apparatus of claim 18, further comprised of the external telephone comprising any one of a public phone, a cellular phone and a portable personal computer including a speech phone capability.

21. The apparatus of claim 20, further comprised of the down-loader for communicating with the E-mail server after the personal computer has been in a power saver mode for a predetermined time and for down-loading new E-mail from the E-mail server to the personal computer when new E-mail has been received, and the down-loader for down-loading new E-mail from the E-mail server to the personal computer when new E-mail has been received when there is a phone call to the personal computer even when the personal computer has not periodically communicated with the E-mail server.

* * * * *